July 27, 1971   E. COEN   3,595,725
TOUGHENING GLASS IN SHEET FORM
Filed April 29, 1969   3 Sheets-Sheet 2

Inventor
Ernesto Coen
By
Morrison, Kennedy & Campbell
Attorneys

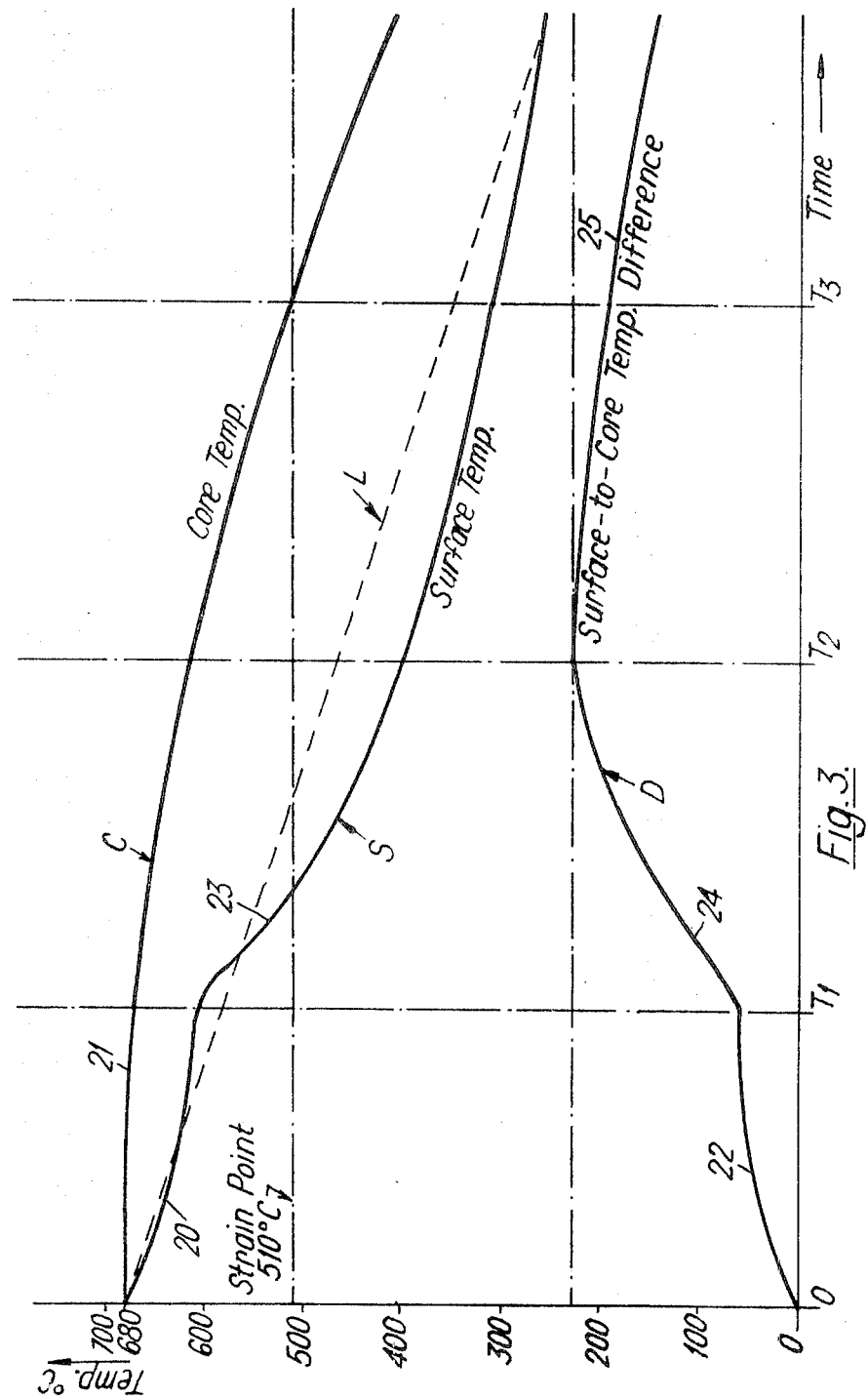

United States Patent Office 3,595,725
Patented July 27, 1971

3,595,725
TOUGHENING GLASS IN SHEET FORM
Ernesto Coen, Liverpool, England, assignor to Pilkington Brothers Limited, Liverpool, England
Continuation-in-part of application Ser. No. 530,844, Mar. 1, 1966. This application Apr. 29, 1969, Ser. No. 826,765
Claims priority, application Great Britain, Apr. 4, 1965, 15,285/65
Int. Cl. C03b 27/00
U.S. Cl. 161—1                           9 Claims

ABSTRACT OF THE DISCLOSURE

A heated glass article is toughened by a two-stage quenching process in the first stage of which gaseous chilling medium lowers the surface temperature of the glass at a predetermined rate and in the second stage of which a higher rate of flow which continues the chilling is so controlled that there is an overall substantially linear rate of fall of the surface temperature of the glass during the whole of the toughening process.

CROSS REFERENCES TO RELATED APPLICATIONS

This application is a continuation-in-part of my copending application Ser. No. 530,844, filed Mar. 1, 1966, now abandoned.

BACKGROUND OF THE INVENTION

This invention relates to the toughening of glass articles and in particular glass in sheet form, wherein the glass is heated to a temperature above the strain point of the glass and then chilled by the action of gaseous chilling medium directed at the surfaces of the glass.

Toughening processes of this kind have long been known and it has always been the practice to carry out the toughening process by directing a chilling medium at the surfaces of the glass at a constant rate for the whole duration of the toughening process. When a higher degree of toughening is desired in glass which is heated to a certain temperature, the practice has been to employ a higher constant rate of flow of the chilling medium.

This process is subject to the limitation that high rates of flow of the gaseous chilling medium in the initial stages of the toughening process may introduce surface stresses so great that the glass shatters. Also the high rates of flow of the chilling medium in the initial stages while the glass is comparatively soft can introduce optical distortions into the surfaces of the glass.

Prolonged experiments conducted by the applicants have now shown that by controlling the rate of cooling and more particularly by chilling the surfaces of the glass initially at a lower rate and then subsequently raising the rate of chilling to a marked degree it is possible to obtain high degrees of toughening without the disadvantages of shattering and the introduction of optical distortions.

When a heated glass article is subjected to the action of a gaseous chilling medium, the surfaces of the glass article are cooled much more quickly than the core or interior of the thickness of the glass of the article during the initial stages of the toughening process, with the result that there is a rapid increase in the surface-to-core temperature difference through the glass thickness. This effect occurs irrespective of the rate at which the gaseous chilling medium is directed at the surfaces of the glass. When the rate of flow of the gaseous chilling medium onto the surfaces of the glass is kept constant, as it is throughout the conventional toughening processes, this difference in temperature will reach a maximum and will gradually decrease again so that ultimately when the glass has cooled to room temperature there is no temperature difference through the thickness of the glass. The degree of toughening present in the cool glass article depends on the value of the difference in temperature between the core and the surfaces of the glass article at the time the glass is cooled through its strain point.

It is a main object of the present invention to modify the chilling process so that the difference in temperature between the core and the surfaces of the glass shall be kept near its maximum at the time that the core of the glass passes through the strain point of the glass while at the same time maintaining an overall substantially linear rate of fall of the surface temperature of the glass throughout the whole toughening process.

SUMMARY

According to the present invention there is provided a method of toughening a glass article comprising heating the glass to a temperature near the softening point of the glass, directing gaseous chilling medium at the surfaces of the glass article at a controlled lower rate of flow in a first quenching step to lower the surface temperature of the glass at a predetermined rate, and when the surface temperature of the glass is approaching constancy directing gaseous chilling medium at the surfaces of the glass article at a higher rate of flow in a second quenching step in which the toughening of the glass article is completed, the rate of flow of the chilling medium in the second quenching step being controlled to maintain an overall substantially linear rate of fall of surface temperature of the glass throughout said first and second quenching steps.

This method not only has the advantage of maintaining an overall substantially linear rate of fall of surface temperature of the glass but also of maintaining the surface to core temperature difference in the glass of the order of the maximum temperature difference established before the core of the glass cools through the strain point of the glass, as the core cools through the strain point.

The directing of the gaseous chilling medium at the glass surfaces at a low rate during the initial stage of the toughening process enables the surfaces of the glass sheet to be set so they will not be substantially deformed by the pressure of gas jets when the gaseous chilling medium is later directed at the surfaces of the glass sheet at a higher velocity than those normally employed in toughening processes. These higher gas pressures may be as high as 12 pounds per square inch or even more if very thin glass is being toughened. In this way localised distortion due to the use of jets of gaseous chilling fluid is reduced to a minimum.

Furthermore a tendency of the glass sheet to bow due to different rates of cooling in the initial stages of the toughening processes, is substantially eliminated by the initial low rate of flow of the gaseous chilling medium.

The feature of the invention whereby the surfaces of the glass sheet are set by the flow of gaseous chilling medium at a low rate during the initial stage of the quenching process has particular utility when the glass sheet is bent because when the surfaces of the glass sheet are immediately subjected to the action of a gaseous chilling medium at a low pressure, the tendency of the glass sheet to return from the curvature to which it has been bent towards its initial planar shape is inhibited, while the danger of distortion of the surfaces of the bent glass due to a high pressure of chilling medium is avoided.

The rate of flow of the gaseous chilling medium may be varied by stepping up the rate of flow in one step or in several steps, or the rate of flow may be gradually increased during the transition from the low rate to the highest rate.

BRIEF DESCRIPTION OF THE DRAWINGS

FIG. 3 is an idealised temperature diagram illustrating the toughening method of the invention.

DESCRIPTION OF THE PREFERRED EMBODIMENTS

Figure 1:
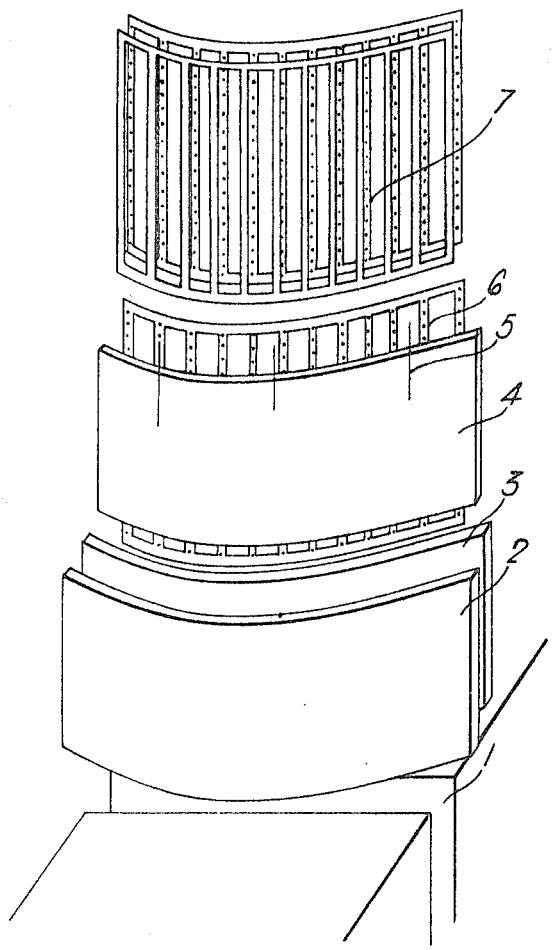
FIG. 1 is an elevation of apparatus according to the invention for bending and toughening flat glass sheets.

Referring to FIG. 1 of the drawings there is shown a furnace 1 into which a flat glass sheet is lowered for heating to a temperature near the softening point of the glass for example 680° C. When the glass sheet has been heated uniformly to this temperature it is raised from the furnace 1 to a position between complementary bending dies 2 and 3 which are brought together to bend the glass sheet to a desired curvature. When the bending dies are opened again the bent glass sheet 4 is raised further by the tongs from which the glass is suspended past a first set of blowing frames 6, only one of which is shown in the drawings which blowing frames are bent to the curvature of the sheet 4 and is further raised from the blowing frames 6 to a final position between a second set of curved blowing frames 7 located above the first set of blowing frames.

For the toughening of a glass sheet which is 3/16 inch thick the first set of blowing frames is supplied with compressed air at a pressure of one inch water gauge, and the bent glass sheet 4 is raised between the blowing frames 6 at such a rate that each part of the sheet is between the blowing frames for a period of 4 seconds. This corresponds to a heat transfer co-efficient of 0.002 calorie per square centimetre per degree centigrade per second. The heat transfer co-efficient, as is well-known in the art of toughening glass, defines the rate of heat transfer between the glass and the chilling medium per unit temperature difference per unit area.

The upper or second set of blowing frames 7 is supplied with compressed air at a normal blowing pressure of for example 10 pounds per square inch and the glass sheet is maintained between this second set of blowing frames 7 for about 20 seconds after which the flow of chilling air is stopped. This corresponds to a heat transfer co-efficient of 0.012 calorie per square centimetre per degree centigrade per second. After the flow of chilling air is stopped the second set of blowing frames 7 are moved apart and the toughened bent glass sheet is removed from the tongs 5 and replaced by a flat glass sheet which is lowered into the furnace 1 for a similar bending and toughening process.

It was found when bending and toughening glass 3/16 inch thick that the preferred time for each part of the glass sheet to be chilled by the low rate of flow of gaseous chilling medium was of the order of 4 seconds and that even with some variation in the blowing pressure this period of 4 seconds was still advantageous.

When bending and toughening a glass sheet of 1/4 inch thickness the preferred period of passage of each part of the glass sheet between the blowing frames 6 was of the order of 6 seconds and there is no substantial variation in this period of 6 seconds for a range of pressures of the gaseous chilling medium supplied to the blowing frames 6.

It was further found that for glass of thickness 3/8 inch the preferred period for the initial quenching step was of the order of 10 seconds. It was still preferred that the pressure of the gaseous chilling medium in this initial step should be about 1 inch water gauge.

FIG. 3 illustrates the operation of the toughening process according to the invention and assuming that there is little loss of heat from the glass during the bending step the initial temperature of the glass as it enters the first blowing frames 6 can be considered as being of the order of 680° C. As the glass surfaces are subjected to the action of the gaseous chilling medium flowing at the lower rate of flow there is an immediate cooling of the surfaces of the glass represented by the part 20 of the cooling curve S which represents the surface temperature of the glass throughout the toughening process. Initially the core temperature represented by the curve C remains steady at or just below the initial temperature of 680° C. and while the surfaces of the glass undergo the initial cooling 20 the core remains at a high temperature as indicated at 21. The curve D represents the surface-to-core temperature difference existing in the glass and initially in the part 22 of this curve a difference is built up and this difference is maintained towards a constant figure as the end of the first quenching step approaches. The end of this first quenching step is indicated at T1 and at this time the surface temperature 20 of the glass is approaching constancy since the rate of fall of the surface temperature is diminishing, the still hot core of the glass serving to diminish the rate of cooling of the glass surfaces after the initial temperature fall of the surfaces.

By time T1 which as stated above may be a period of 4, 6 or 10 seconds, the glass has reached the upper set of blowing frames 7 and each part of the glass is then subjected to the higher rate of flow of the cooling air for example at 10 pounds per square inch as described above. There is an immediate further fall in the surface temperature of the glass indicated at 23 while initially the core temperature falls only slightly. The drop in surface temperature 23 is reflected by a rise 24 in the surface-to-core temperature difference which reaches a maximum after a time T2 by which time there has been an appreciable fall in the surface temperature of the glass for example down to about 450° C. while the core of the glass is still at about 600° C. That is this maximum temperature difference is reached before the core of the glass cools to the strain point of the glass which for the usual soda-lime-silica glass is in the region of 510° C. The strain point is indicated on the curve and the core of the glass passes through the strain point at a later time T3.

Throughout the period T2 to T3 there is little change in the surface-to-core temperature difference as indicated by the part 25 of the curve D. There is of course some slight fall in this temperature difference but as the chilling of the glass at the higher rate of flow continues the surface-to-core temperature difference is maintained at a value of the order of the maximum temperature difference achieved at time T2. Thus as the core of the glass passes through the strain point this maximum temperature difference is maintained while at the same time the cooling curve of the surface temperature of the glass, being made up of two parts can be considered as an overall substantially linear rate of fall of surface temperature of the glass throughout the first and second quenching steps as indicated by the line L. It must be emphasized that the curve S is an idealised curve and the definition between the two parts of this curve does not necessarily exist in practice, the curve S usually approaching more nearly to the linear form L.

The combination of the achievement of this linearity in the fall of the surface temperature of the glass throughout the toughening process together with the achievement of a maximum surface-to-core temperature difference prior to the cooling of the core of the glass through the strain point, and the maintenance of that temperature difference as the core of the glass passes through the strain point, achieves a toughened bent glass sheet having no localised surface distortion. Furthermore the bent glass sheet can have a greater stress, that is to say it can be more highly toughened, than has been possible hitherto and yet still has virtually no localised surface distortion arising from the flow of jets of chilling medium onto the surfaces of the bent glass sheet.

In practice it has been found that toughened glass sheets having a greater strength than has been obtained previously by conventional toughening processes may be produced by the process according to the present invention, without the risk of surface distortion.

Furthermore the toughening method of the present invention reduces variations in the degree of toughening in localised areas of a glass article and this is particularly important in the toughening of sheet glass because these variations in the degree of toughening of adjacent areas of the glass tend to result in optical distortion. Accordingly sheets of glass toughened in accordance with the present invention may be used as windscreens raked to a substantial angle, for example 30°, without any objectionable distortion due to local variations in the degree of toughening being apparent.

Figure 2:
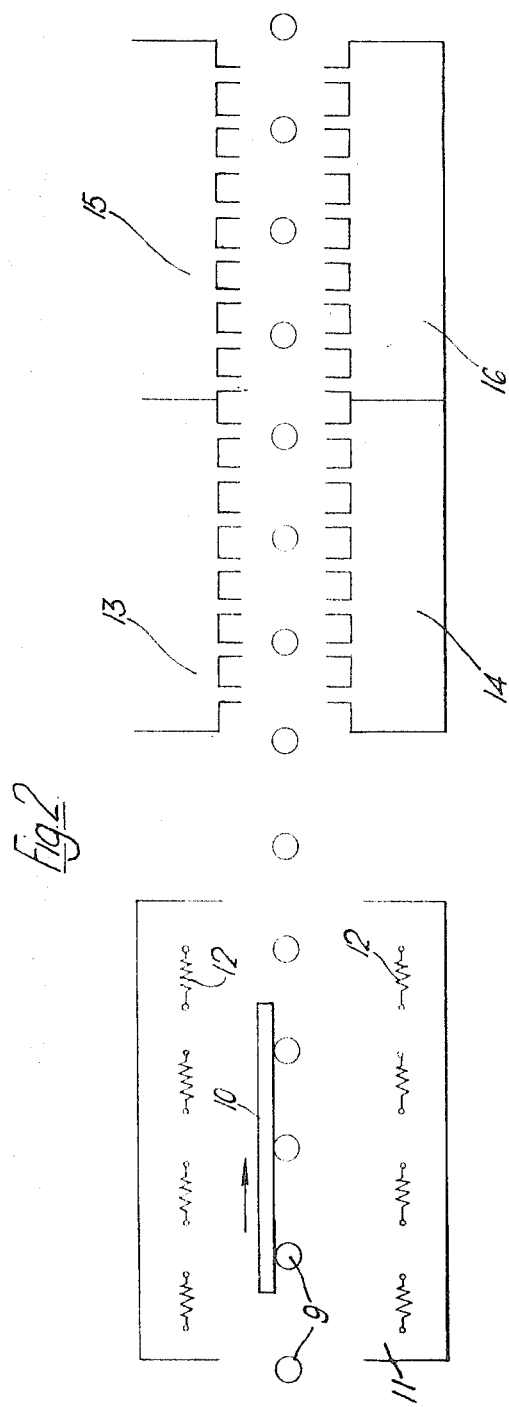
FIG. 2 shows an alternative method of toughening a glass sheet in which the glass passes horizontally through the toughening process.

In FIG. 2 of the drawings there is shown an alternative method of toughening a glass sheet. A series of rollers 9 which are all driven at the same speed by means not shown act as a conveyor upon which a flat glass sheet 10 is advanced horizontally.

During its advance over the series of rollers 9 the glass sheet passes through a furnace 11 containing heating elements 12 above and below the glass and arranged in conjunction with the time for which the glass sheet 10 is within the furnace 11 to heat the glass sheet to a temperature for example of the order of 630° C. by the time that the glass sheet emerges from the right hand end of the furnace 11 as seen in FIG. 2. At the temperature of 630° C. which is uniform through the thickness of the glass sheet, the glass is well above the strain point, but the glass is on the other hand resistant to surface markings due to contact of the glass with the rollers 9.

The hot glass sheet emerging from the furnace 11 is passed through a small space and then between upper and lower blowing frames 13 and 14 which blow chilling air at the glass at a low pressure; for example the blowing frames are supplied with compressed air at a pressure of 1 inch water gauge and the rate at which the glass passes between the blowing frames considered in conjunction with the pressure of blowing provides an effective heat transfer co-efficient of 0.002 calorie per square centimetre per degree centigrade per second. Advantageously the blowing frames 13 and 14 are supplied with compressed air at a pressure of 1 inch water gauge.

The rate at which the glass sheet 10 is advanced by the series of rollers is such that when the glass sheet is of ¼ inch thickness it is between the blowing frames 13 and 14 for approximately 6 seconds. A glass sheet of ³⁄₁₆ inch thickness would be between the blowing frames for 4 seconds and a glass sheet of ⅜ inch thickness would be between the blowing frames for 10 seconds.

The glass sheet is then passed between blowing frames 15 and 16 which are supplied with compressed air at a higher blowing pressure for example 10 pounds per square inch and the time during which the glass sheet is subjected to this blowing pressure is such as to provide an effective heat transfer co-efficient of 0.012 calorie per square centimetre per degree centigrade per second. During its passage between the blowing frames 15 and 16 the glass sheet is cooled to a temperature well below the strain point of the glass and a desired degree of toughening is achieved in the glass sheet.

By the method described with reference to FIG. 2 the glass sheet is toughened to a desired degree of toughening and the presence of tong marks on the glass sheet is avoided, the surfaces of the glass sheet 10 being unimpaired by the toughening process.

The glass sheet toughened by this horizontal method has all the desirable qualities maintained in the toughened glass sheet produced by the vertical method illustrated in FIG. 1 and the temperature changes in the glass throughout the toughening process can equally well be illustrated by a temperature diagram equivalent to the temperature/time regime illustrated in FIG. 3.

In addition to the toughening of glass sheets which has been described with reference to the accompanying drawings the present invention also has application to the toughening of other glass articles and particular to the toughening of glass insulators.

It is desirable to obtain comparatively high degrees of toughening in glass insulators, and the present invention enables these high degrees of toughening to be obtained with the substantial avoidance of interruptions to the process by shattering of the insulators when they are first subjected to the chilling medium.

I claim:

1. A method of toughening a glass article comprising heating the glass to a temperature near the softening point of the glass, simultaneously and independently ejecting a gaseous chilling medium from a multiplicity of points toward and against the lateral parts as well as the intermediate parts of each of opposite surfaces of the glass article at a controlled lower rate of flow in a first quenching step for a period of time to lower the surface temperature of the glass at a rate which reduces to constancy at the end of the period, and in a second quenching step simultaneously and independently ejecting a gaseous chilling medium from a multiplicity of points toward and against the lateral parts as well as the intermediate parts of each of opposite surfaces of the glass article at a controlled rate of flow for a period of time in which the toughening of the article is completed, the rate of flow of the chilling medium in the second quenching step being controlled to maintain an overall substantially linear rate of fall of surface temperature of the glass throughout said first and second quenching steps.

2. A method of roughening glass in sheet form whose thickness is in the range ³⁄₁₆ inch to ¼ inch, comprising heating the glass to a temperature near the softening point of the glass, simultaneously and independently ejecting a gaseous chilling medium from a multiplicity of points toward and against the lateral parts as well as the intermediate parts of each of opposite surfaces of the glass sheet at a rate of flow providing an effective heat transfer co-efficient of 0.002 for a period of from 4 to 6 seconds, and subsequently simultaneously and independently ejecting a gaseous chilling medium from a multiplicity of points toward and against the lateral parts as well as the intermediate parts of each of opposite surfaces of the glass sheet at a rate of flow yielding an effective heat transfer co-efficient of 0.012 until toughening of the glass is completed, thereby maintaining an overall substantially linear rate of fall of the surface temperature throughout the quenching of the glass.

3. A method according to claim 2, wherein for toughening a glass sheet of ¼ inch thickness gaseous chilling medium is initially directed against the surfaces of the glass sheet at a pressure of 1 inch water gauge for 6 seconds.

4. A method according to claim 2, wherein for toughening a glass sheet of ³⁄₁₆ inch thickness gaseous chilling medium is initially directed against the surfaces of the glass sheet at a pressure of 1 inch water gauge for 4 seconds.

5. A method according to claim 2, wherein for toughening a glass sheet of ⅜ inch thickness gaseous chilling medium is initially directed against the surfaces of the glass sheet at a pressure of 1 inch water gauge for 10 seconds.

6. A method according to claim 1, for toughening a bent glass sheet, including the preliminary steps of heating a flat glass sheet to a temperature near the softening point of the glass, and bending the hot glass sheet between complementary bending dies before directing gaseous chilling medium against the glass surfaces.

7. A method according to claim 1, wherein the rate of flow of gaseous chilling medium is gradually raised from said lower rate to said higher rate.

8. A toughened glass article produced by a method according to claim 1, which is free from surface distortion and objectionable variations in the degree of toughening of localised areas of the article.

9. A method of toughening a glass article comprising heating the glass to a temperature near the softening point of the glass, simultaneously and independently ejecting a gaseous chilling medium from a multiplicity of points toward and against the lateral parts as well as the intermediate parts of each of opposite surfaces of the glass article at a controlled lower rate of flow in a first quenching step to lower the surface temperature of the glass at a predetermined rate, and when the surface temperature of the glass is approaching constancy simultaneously and independently ejecting a gaseous chilling medium from a multiplicity of points toward and against the lateral parts as well as the intermediate parts of each of opposite surfaces of the glass article at a higher rate of flow in a second quenching step to establish a maximum temperature difference between the core and the surfaces of the glass before the core of the glass cools through the strain point of the glass, and continuing the chilling of the glass at said higher rate of flow to maintain surface-to-core temperature difference of the order of said maxium temperature difference in the glass as its core cools through the strain point of the glass.

References Cited
UNITED STATES PATENTS 3,265,484   8/1966   Ritter, Jr. _____ 65—104

ARTHUR D. KELLOGG, Primary Examiner

U.S. Cl. X.R.

65—104, 114

UNITED STATES PATENT OFFICE
CERTIFICATE OF CORRECTION

Patent No. 3,595,725      Dated July 27, 1971

Inventor(s) Ernesto Coen

It is certified that error appears in the above-identified patent and that said Letters Patent are hereby corrected as shown below:

Column 6, line 35 change "roughening" to --toughening--.

Signed and sealed this 13th day of June 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,595,725      Dated July 27, 1971

Inventor(s) Ernesto Coen

It is certified that error appears in the above-identified patent and that said Letters Patent are hereby corrected as shown below:

Change priority date from "April 4, 1965" to --April 9, 1965--.

Signed and sealed this 23rd day of January 1973.

(SEAL)
Attest:

EDWARD M. FLETCHER, JR.
Attesting Officer

ROBERT GOTTSCHALK
Commissioner of Patents